United States Patent
Bacus et al.

(10) Patent No.: US 10,193,822 B1
(45) Date of Patent: Jan. 29, 2019

(54) PREDICTIVE AUTO-SCALING AND REACTIVE AUTO-SCALING FOR NETWORK ACCESSIBLE MESSAGING SERVICES

(71) Applicant: Amazon Technologies, Inc., Seattle, WA (US)

(72) Inventors: Michael Patrick Bacus, Seattle, WA (US); Peter Snoblin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 260 days.

(21) Appl. No.: 15/240,592

(22) Filed: Aug. 18, 2016

(51) Int. Cl.
| | | |
|---|---|---|
| *G06F 15/173* | (2006.01) | |
| *H04L 12/911* | (2013.01) | |
| *H04L 12/801* | (2013.01) | |

(52) U.S. Cl.
CPC .......... *H04L 47/788* (2013.01); *H04L 47/127* (2013.01)

(58) Field of Classification Search
CPC ............................ H04L 47/788; H04L 47/127
See application file for complete search history.

(56) References Cited

U.S. PATENT DOCUMENTS

| | | | | |
|---|---|---|---|---|
| 2005/0138112 | A1* | 6/2005 | Sagar | H04L 67/14 709/203 |
| 2011/0004885 | A1* | 1/2011 | Kikuchi | H04L 41/147 718/104 |
| 2014/0337442 | A1* | 11/2014 | Zhuang | H04L 51/066 709/206 |
| 2016/0282132 | A1* | 9/2016 | Bostick | G01C 21/3415 |
| 2017/0163495 | A1* | 6/2017 | Kurian | H04L 47/625 |

* cited by examiner

*Primary Examiner* — Richard G Keehn
(74) *Attorney, Agent, or Firm* — Lee & Hayes, P.C.

(57) ABSTRACT

Technologies are disclosed for providing predictive auto-scaling for resources of a network-accessible message processing service. Control metrics are analyzed in order to predict a future volume of messages that will be received and processed by the message processing service. Based upon the prediction, resources, in the form of computing resources, are allocated to the message processing service. Reactive auto-scaling of the resources can also be used in conjunction with predictive auto-scaling. For reactive auto-scaling, an enqueue rate at a queuing service for messages is monitored and resources are reactively auto-scaled accordingly.

20 Claims, 8 Drawing Sheets

PREDICTIVE AUTO-SCALING AND REACTIVE AUTO-SCALING FOR NETWORK ACCESSIBLE MESSAGING SERVICES

BACKGROUND

Asynchronous messaging protocol ("AMP") messaging infrastructure is an enterprise grade solution for sending multiple asynchronous request/response pairs over the same connection. AMP messaging infrastructure generally has a limited ability to scale beyond a certain volume without provisioning a new broker cluster of service providers and dividing message traffic among the clusters.

Generally, AMP messaging infrastructure is scaled using reactive auto-scaling, which is typically not fast enough to prevent negative impact to low latency message processing systems when unexpected message spikes are encountered. Message backlogs within AMP messaging infrastructure can occur when there is a mismatch between message production rates and message consumption/processing rates. Such mismatches can occur when the production rate increases, the consumption rate decreases, or a combination of both.

The disclosure made herein is presented with respect to these and other considerations.

DETAILED DESCRIPTION

Figure 1:
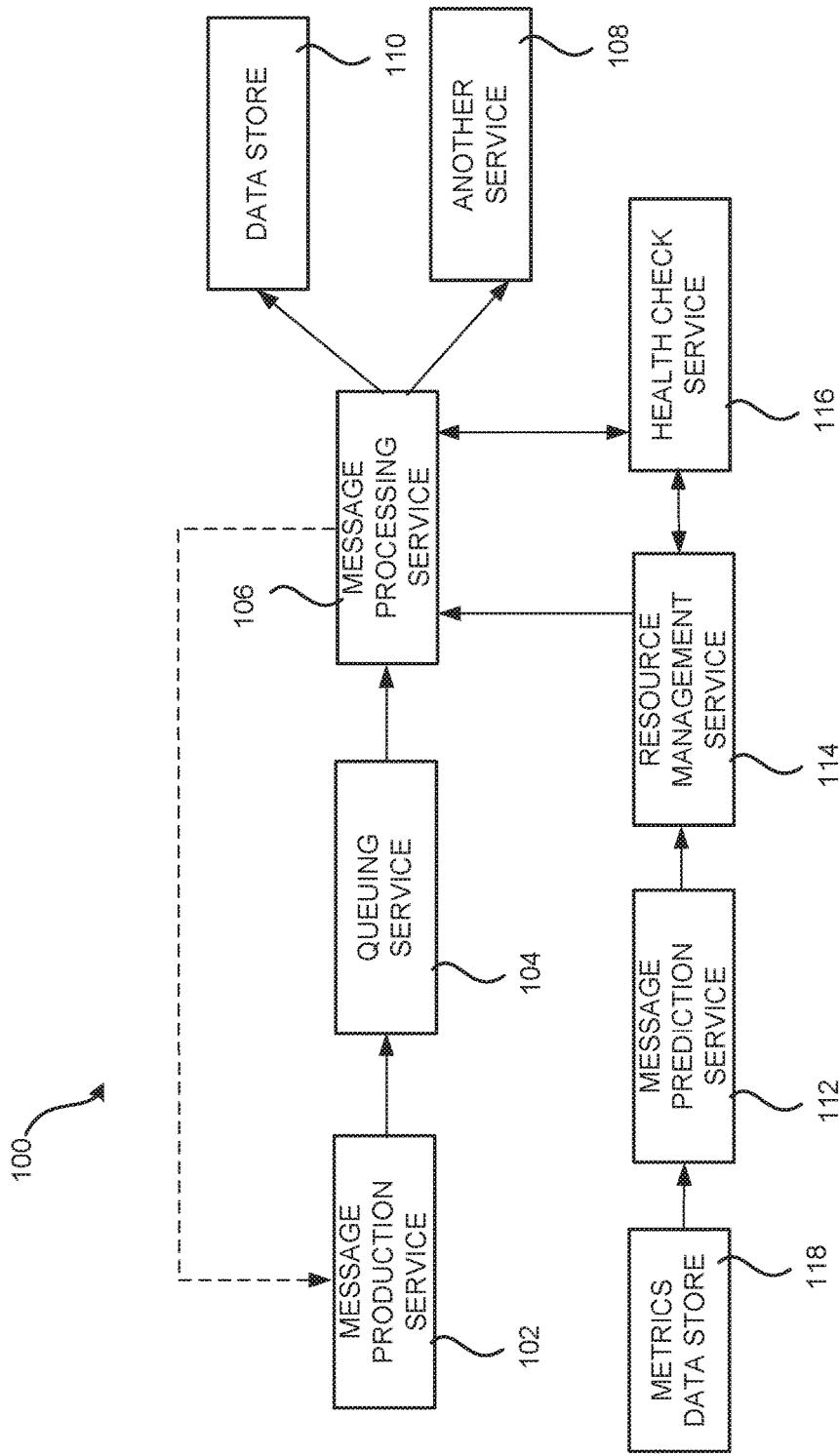
FIG. 1 schematically illustrates an environment for AMP messaging infrastructure, wherein one or more of the components are provided within a network accessible computing environment.

The following detailed description is directed to technologies for providing predictive auto-scaling and reactive auto-scaling of computing resources ("resources") for a network-accessible message processing service. Utilizing the technologies described herein can improve efficiencies and latencies in the processing of messages by the network-accessible message processing service. Resources needed and allocated to the message processing service can be automatically increased or decreased using predictive auto-scaling in conjunction with reactive auto-scaling. Additionally, characteristics of the resources can be scaled. For example, speeds of processing, writing and/or reading by resources can be automatically increased or decreased using predictive auto-scaling in conjunction with reactive auto-scaling. Such auto-scaling of resources can help ensure that the resources used by the message processing service are efficiently allocated and utilized, and help ensure resources are available for other services. Technical benefits other than those specifically identified herein might be realized through an implementation of the technologies disclosed herein.

In accordance with various configurations, a network accessible message processing service generally comprises asynchronous messaging protocol ("AMP") messaging infrastructure. Generally, messages are produced, where the messages trigger an event such as providing information, providing data, requesting some type of operation, generating a new message, updating something, etc. These messages are provided to a queuing service. The message processing service monitors the queuing service and processes messages from the queuing service. The processed messages can be returned to the message producer and/or can be provided to other entities. Generally, the processed messages are also provided to a data store. When the resources used by the message processing service reach peak utilization, a backlog of messages can begin to occur at the queuing service. Thus, the latency of the processing of the messages increases, which can result in undesired delays.

Generally, the message processing service accepts or retrieves messages from the queuing service, parses the messages, potentially transcodes/filters the messages, persists the messages, as well as other functions. The message processing service usually contains processing logic that is triggered by the messages. Based upon the processing logic, the messages are processed (or consumed) and acknowledged. As previously noted, the processed messages can be modified and passed to the message producer, a downstream "listener" such as another network service, and/or stored in a data store.

In accordance with various configurations, in order to achieve a low-latency message processing service, predictive auto-scaling is utilized in order to create an early warning system for potential problems. Thus, in configurations, base measures of message traffic are analyzed with respect to message throughput (the rate of successful message delivery over time) for the message processing service. Based upon the analysis, future increases in message volume can be predicted to provide forecasts for a period of time, e.g., a day. Such forecasts can include seasonality spikes for unusually busy periods of activity, e.g., known busy days.

Additionally, message volumes generally rise and fall during the day, and commonly follow a saw-tooth pattern from day-to-day. Thus, in configurations, upper and lower bounds for message processing during the day for the message processing service can be determined using predictive auto-scaling. Based upon the upper and lower bounds and predicted message volume, the resources provided for the message processing service can be scaled a day or more in advance in order to accommodate the available provisioning horizon or forecast temporal granularity.

More particularly, for predictive auto-scaling, the current capacity of resources used by the message processing service is compared against the next day's message volume forecast. If the forecast message volume is calculated to exceed the upper (or lower) bound of resource utilization, then the resources allocated to the message processing service can be scaled to compensate.

In configurations, an additional check is made against the next day's peak message volume in order to determine if the next day's peak message volume would cause the resources used by the message processing service to exceed the upper (or lower) bound of the resources of the message processing service. If so, the resources available to the message processing service can be scaled to compensate.

In other configurations, down-scaling of the resources of the message processing service is delayed by a predetermined amount of time, for example, a day. Thus, in configurations, the message processing service is generally quick to up-scale but slow to down-scale. Delaying the down-scaling can help prevent unforeseen delays in processing of messages due to inaccurate predictions.

In addition to predictive auto-scaling, reactive auto-scaling can also be utilized. Reactive auto-scaling generally looks at various metrics such as, for example, resource utilization. Thus, for the message processing system, the throughput rate (the rate of successful message delivery over time) is generally analyzed. In poorly managed environments, when messages start backing up within the queuing service, more capacity or extra resources are added for use by the message processing service. However, a well-managed system generally never enters into such a state. The resource utilization (or other considerations) should be monitored to provide notice when the message processing service needs adjustment. Thus, reactive auto-scaling can utilize upper and lower bounds for resource utilization that when exceeded trigger upscaling or downscaling of the message processing service to occur. Such processing and analyzing can be handled by a health check service for the message processing service.

In general, the health check service evaluates information and draws correlations between data inputs and controls scaling capabilities. Thus, the health check service continuously evaluates the capacity of the message processing service against observed message rates, processing times and predicted volumes, scaling resources for the message processing service up and down as needed.

The health check service can utilize a message forecast stream and throughput measures from the resources utilized by the message processing service (i.e., message consumption per resource utilization over time). Each resource generally operates with an upper/lower bound of utilization, with the goal to settle the message processing service at a mid-point in the utilization range by adding or reducing capacity of resources for the message processing service. In configurations, the health check service also handles the predictive auto-scaling and the scaling of resources for the message processing service based thereon.

In configurations, resources for the message processing service comprise a fleet of servers, wherein the servers comprise one or more processors or central processing units ("CPUs"). In configurations, the servers host virtual machine instances. In other configurations, the resources for the message processing service comprise stateless event-driven compute services. An example of such stateless event-driven compute services is the LAMBDA serverless compute service available from AMAZON WEB SERVICES ("AWS"). In configurations, the resources can comprise a mixture of servers and stateless event-driven compute services. For example, the resources can primarily comprise stateless event-driven compute services and servers that can be utilized as a back-up for overflow for the stateless event-driven compute service. Additional details regarding the various components and processes described above for an AMP messaging infrastructure that includes predictive auto-scaling and reactive auto-scaling will be presented below with regard to FIGS. 1-6.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable electronic devices, minicomputers, mainframe computers, handheld computers, personal digital assistants, e-readers, cellular telephone devices, special-purposed hardware devices, network appliances, and the like. The configurations described herein can also be practiced in distributed computing environments, where tasks can be performed by remote computing devices that are linked through a communications network. In a distributed computing environment, program modules can be located in and executed from both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 schematically illustrates a service provider network 100 for AMP messaging infrastructure, wherein one or more of the components are provided within a service provider network. Generally, a message production service 102 produces streams of messages. Such messages provide information, data, requests for an event or service, instruct to generate a new message to provide to another service or entity, update something, etc.

The produced messages are provided to a queuing service 104 to await processing or consumption by a message processing service 106. In configurations, the message queuing service 104 and the message processing service 106 are a network-accessible queuing service and a network-accessible message processing service, i.e., the queuing service and the message processing service are located within the service provider network 100. For example, the queuing service 104 can be provided by the Simple Queue Service ("SQS") provided by AWS and the message processing service 106 can be provided by the Elastic Compute Service ("EC2") and/or the LAMBDA serverless compute service, also provided by AWS.

The message processing service 106 generally monitors or "listens to" the queuing service 104 for messages that need to be processed. As messages arrive at the queuing service 104, the message processing service 106 retrieves or dequeues the messages from the queuing service 104 and processes the messages. The results of the processing of the messages can be provided back to the message production service 102, to another service 108 or downstream listener, and/or to a data store 110 for access by various services and entities.

A message prediction service 112 is also provided that can be utilized to predict a message volume for a period of time such as, for example, the next day. Additionally, the message prediction service 112 can be utilized to predict a volume of messages for peak and/or low points of message volume during the period of time, e.g. peak and/or low points of message volumes on an hourly basis during the period of time. For example, message prediction service 112 may predict that the peak message volume may occur between 3:00 and 4:00 pm and the low point may for message volume may occur between 1:00 and 2:00 am. Based upon the predictions of the message prediction service 112, a resource management service 114 can predict needed resources for the message processing service 106 and allocate such resources accordingly, thus providing predictive auto-scaling. Additionally, characteristics of the resources can be scaled based upon the predictions of the message prediction service 112. For example, speeds of processing, writing and/or reading by resources can be automatically increased or decreased.

A health check service 116 is also provided to monitor utilization of resources by the message processing service in order to ensure that the resources are not being underutilized, and thus the resources can be better utilized by another service. The health check service 116 also monitors utilization of resources of the message processing service 106 in order to ensure that the resources are not being "overutilized" and thus, the message processing service 106 cannot keep up with the volume of messages being generated by the message production service 102.

The monitoring of the utilization of resources of the message processing service 106 can be provided by monitoring the enqueue rate of messages at the queuing service 104 and/or the dequeue rate of messages from the queuing service 104 by the message processing service 106. The health check service 116 can provide information to the resource management service 114 in order to allow the resource management service 114 to provide reactive auto-scaling of resources for the message processing service. In configurations, the message prediction service 112, the resource management service 114 and/or the health check service 114 are part of an integrated service that can serve as a control service.

In configurations, the resources of the message processing service 106 comprise a plurality or fleet of servers or virtual machine ("VM") instances. The servers generally include physical or virtual processors or central processing units ("CPUs") that are utilized to process the messages. Thus, as utilized herein, fleet of servers encompasses, but is not limited to, computing devices that include physical or virtual processors or central processing units ("CPUs"). In configurations, the resources of the message processing service 106 comprise stateless event-driven compute services. In configurations, the resources utilized by the message processing service 106 comprise a combination of servers and stateless event-driven compute services. Other types of computing resources can also be utilized in other configurations.

Generally, each message is part of a key message and includes a revision number ("RVN"). The RVNs indicate a timeline for the messages. A particular message of a key having a higher RVN indicates that it is a more recent message that makes a previous message of the key message redundant or unneeded. In accordance with configurations, the queuing service 104 utilizes a full message replacement system. Thus, the queuing service 104 filters out or "drops" messages of a key message within the queuing service 104 that include earlier or lower RVNs when a message of the key message having a higher or later RVN is received in order to avoid unnecessary processing of messages.

In accordance with various configurations, the message prediction service 112 analyzes various control metrics in order to perform predictive auto-scaling. In configurations, Message Traffic Forecasts are correlated to X messages/day produced by the message processing service 106. A calculation of CPU utilization (or stateless event-driven compute service utilization) of the message processing service 106 that is necessary to process Y messages is calculated. An upper/lower bound of message throughput per day is calculated.

In general, throughput equals messages/hour per 1% CPU utilization of the message processing service 106. The number of needed servers or VMs (resources for the message processing service 106) equals (forecast messages/day)/(CPU utilization midpoint*throughput*24 hours). Peak CPU utilization equals throughput/(upper bound of messages/hour). The message volume/hour equals the number of hosts*avg CPU utilization*throughput, while CPU utilization equals message volume/(# hosts*throughput).

Accordingly, as previously noted, in order to achieve a low-latency message processing service 106, predictive auto-scaling is utilized in order to create an early warning system for potential problems. Thus, in configurations, the message prediction service 112 evaluates a history of message throughput for the message processing service 106. The history of message throughput, as well as other data and metrics can be provided by a metrics data store 118. Based upon the analysis, future increases in message volume can be predicted in order to provide forecasts for a period of time, e.g., a day. Such forecasts can include seasonality spikes for unusually busy periods of activity, e.g., known busy days. Additionally, message volumes generally rise and fall during the day, and often follow a saw-tooth pattern from day-to-day. Thus, in configurations, the upper and lower bounds for message processing during the day for the message processing service 106 can be determined by the message prediction service 112 based upon historic patterns, including peak periods for message processing during the day.

Based upon the upper and lower bounds and predicted message volume, the resource management service 114 can predict and allocate resources for the message processing service 106 and thus, the resources can be scaled a day or more in advance in order to accommodate predicted volumes of messages. The resource management service 114 can adjust resources for the message processing service 106 up or down from current resource allocations for the message processing service 106. Additionally, the resource management service 114 can adjust characteristics of the resources. For example, speeds of processing, writing and/or reading by resources can be automatically increased or decreased by the resource management service 114.

More particularly, for predictive auto-scaling, the resource management service 114 will compare the current capacity of resources for the message processing service 106 to the next day's message volume forecast provided by the message prediction service 112. If the forecast message volume is calculated by the message prediction service 112 to exceed the upper (or lower) bound of resource utilization by the message processing service 106, then the resources allocated to the message processing service 106 can be adjusted by the resource management service 114 to compensate.

In configurations, an additional check is made by the resource management service 114 against the next day's predicted peak message volume in order to determine if the next day's predicted peak message volume would put the resources of the message processing service 106 in excess of the upper (or lower) bound of the resource utilization allocated to the message processing service 106. If so, the message processing service 106 can be adjusted by the resource management service 114 to compensate.

In configurations, downscaling of the resources of the message processing service is delayed by a predetermined amount of time, for example, a day. Thus, in configurations, the resource management service 114 is generally quick to upscale but slow to downscale. Delaying the downscaling can help prevent unforeseen delays in processing of messages due to inaccurate predictions by the message prediction service 112.

In addition to predictive auto-scaling, reactive auto-scaling can also be utilized. Reactive auto-scaling generally looks at, for example, resource utilization. Thus, for the message processing system 106, the throughput rate is generally monitored and analyzed by the health check service 116. The health check service also monitors the upper and lower bounds for resource utilization by the message processing service 106. When the upper or lower bounds are exceeded, the health check service 116 alerts the resource management service 114 to upscale or downscale the resources, and/or the characteristics of the resources, of the message processing service 106. In configurations, the health check service 116 adjusts the allocation of resources for the message processing service 106 itself.

In configurations, the message processing service 106 can comprise a mixture of stateless event-driven compute services and physical or virtual servers. Priority can be given to utilizing the stateless event-driven compute services for processing of messages by the message processing service 106. If the upper bound of resource utilization is exceeded such that all of the available stateless event-driven compute services are being utilized, then the message processing service 106 can use the servers as overflow to help maintain low latency in the processing of messages.

In configurations, the message production service 102 can prioritize messages for processing by the message processing service 106. Stateless event-driven compute services can be utilized to orchestrate the priority of the messages for prioritizing by the message processing service 106.

It is to be appreciated that the examples given above are merely illustrative and that other techniques can be used for predictive auto-scaling and/or reactive auto-scaling of resources for various network-accessible services in other configurations. Additional details regarding the arrangement shown in FIG. 1 will be provided below with respect to FIGS. 2A, 2B and 3.

Figure 2A:
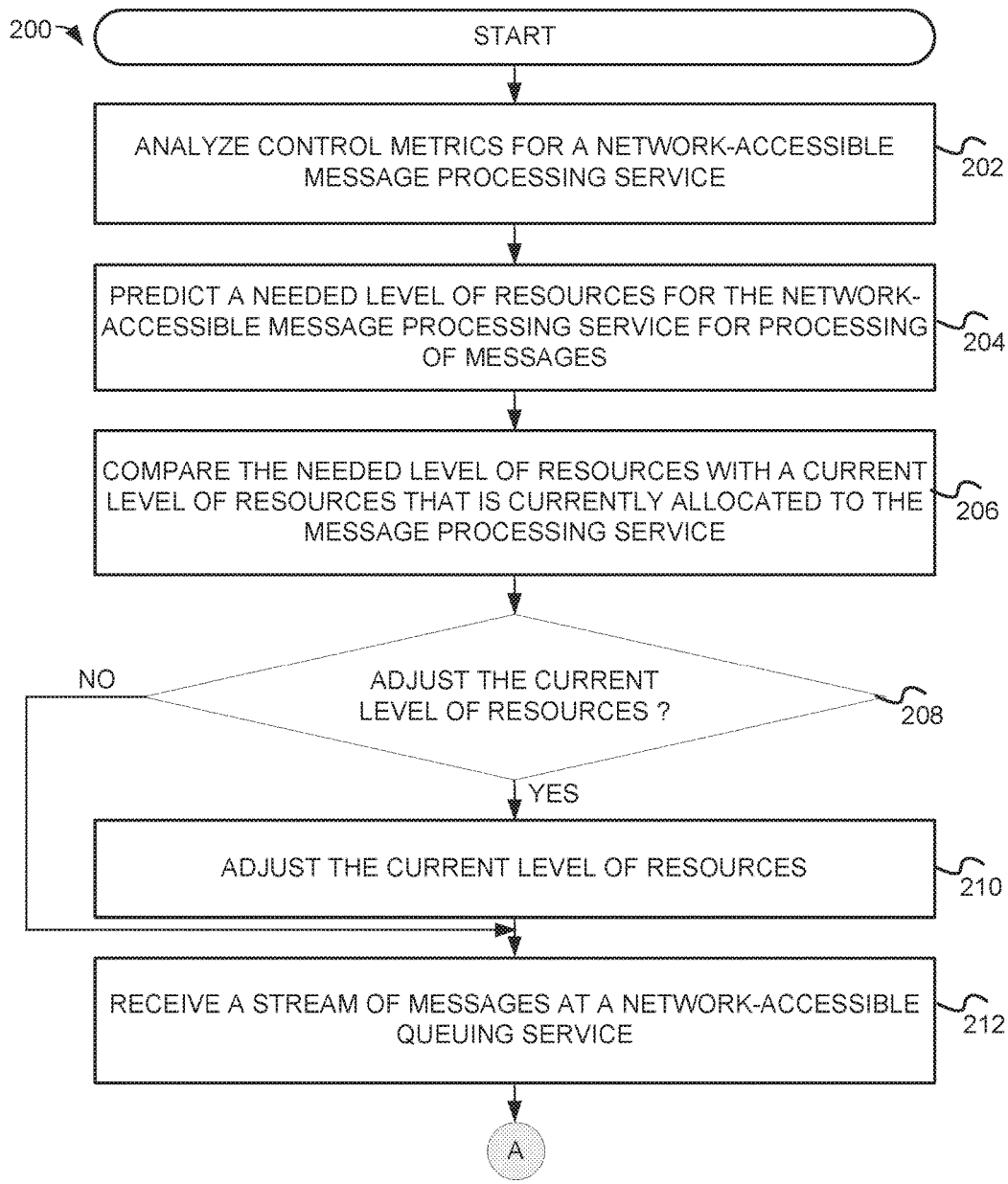
FIGS. 2A and 2B include a flow diagram showing a routine that illustrates aspects of auto-scaling of resources for the environment for AMP messaging infrastructure of FIG. 1, according to one particular configuration.
Figure 2B:
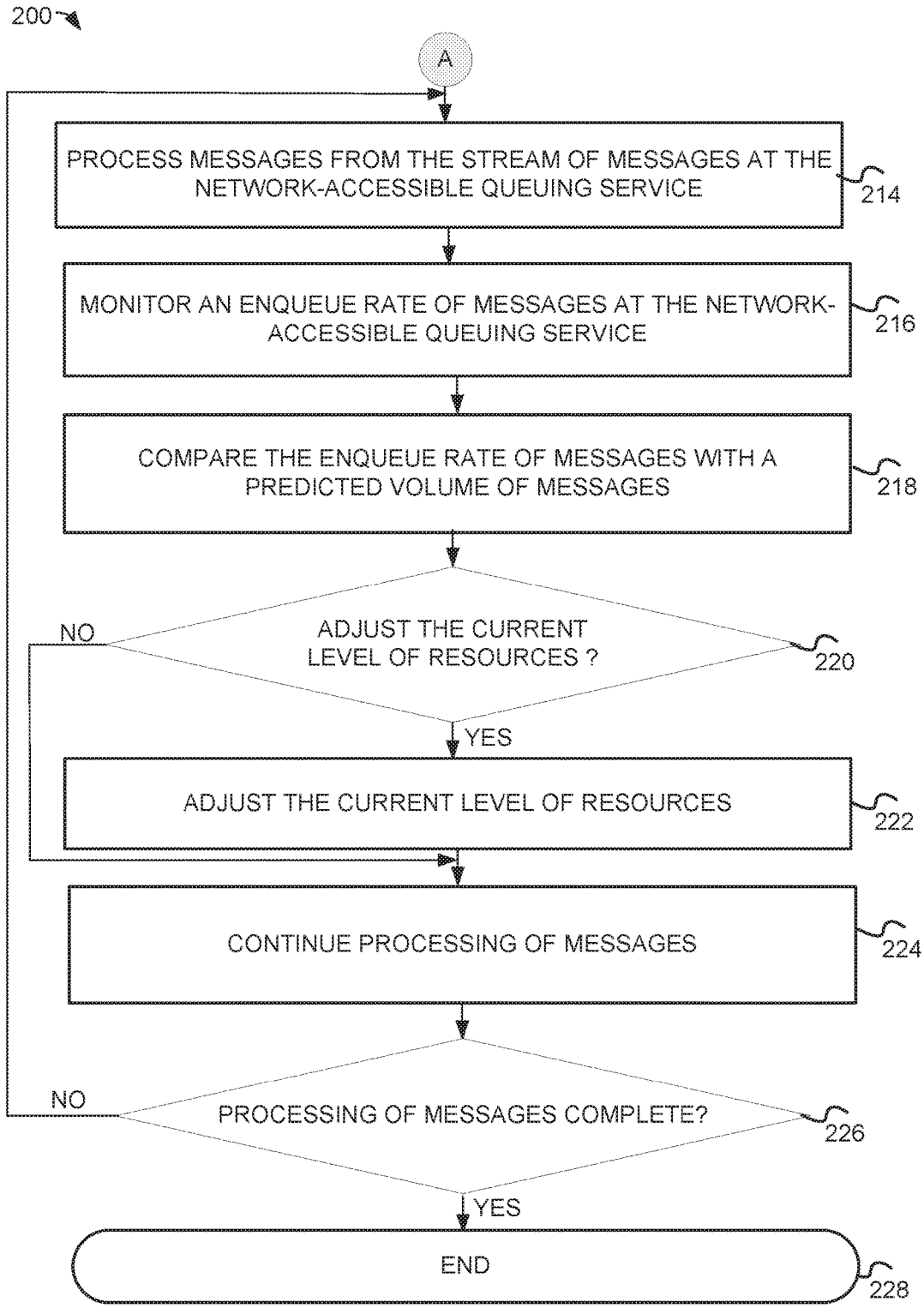

FIGS. 2A and 2B include a flow diagram showing a routine 200 that illustrates aspects of one mechanism for auto-scaling of resources for providing the AMP messaging infrastructure showin in FIG. 1, according to one particular configuration. In particular, the routine 200 illustrates aspects of the operation of the environment 100 for providing AMP messaging infrastructure including predictive auto-scaling and reactive auto-scaling of resources for implementing the AMP messaging infrastructure.

Figure 3:
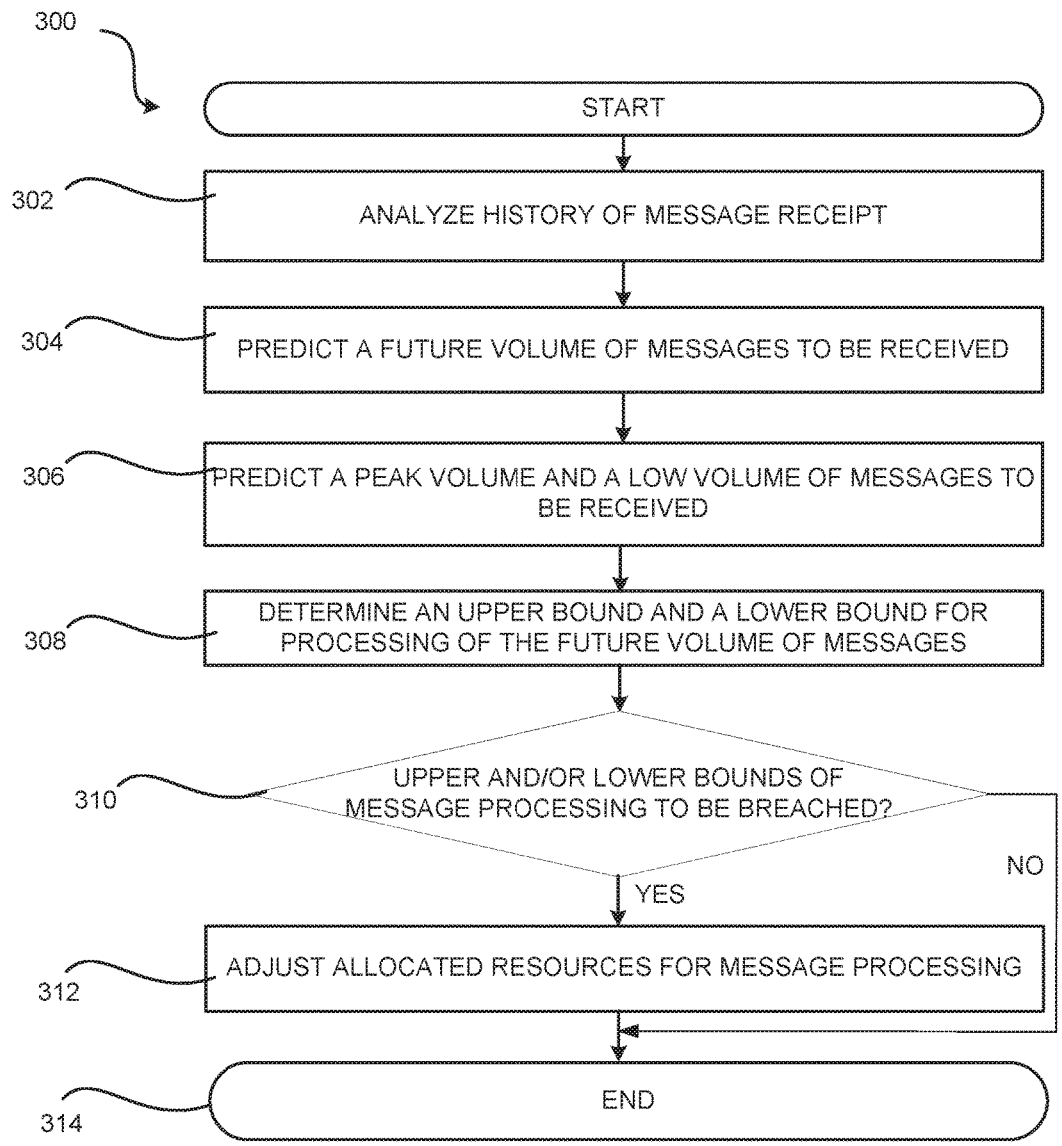
FIG. 3 is a flow diagram showing a routine that further illustrates aspects of auto-scaling of resources for the environment for AMP messaging infrastructure of FIG. 1, according to one particular configuration, according to one configuration.

It is to be appreciated that the logical operations described herein with respect to FIGS. 2A, 2B and 3 (and the other FIGS.) can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 200 begins at operation 202, where control metrics for a network-accessible message processing service, such as, for example, message processing service 106, are analyzed. As discussed above, the control metrics can be analyzed by the message prediction service 112. The routine 200 then proceeds from operation 202 to operation 204, where a level of needed resources is predicted for the message processing service. For example, and without limitation, the resource management service 114 can predict a level of resources needed for the message processing service 106 based upon the analysis of control metrics provided by the message prediction service 112.

From operation 204, the routine 200 proceeds to operation 206, where the needed level of resources for the message processing service is compared with a current level of resources that is currently allocated to the message processing service. From operation 206, the routine 200 proceeds to operation 208, where based upon the comparison at operation 206 it is determined whether the current level of resources allocated to the message processing service needs to be adjusted. If the resources need to be adjusted, the routine 200 proceeds from operation 208 to operation 210, where the current level of resources allocated to the message processing service is adjusted by the resource management service. The routine 200 then proceeds to operation 212. If the resources do not need to be adjusted, the routine 200 proceeds from operation 210 to operation 212.

At operation 212, a stream of messages is received, for example, at a network-accessible queuing service such as the queuing service 104. At operation 214, the messages from the queuing service are processed by the message processing service. From operation 214, the routine 200 proceeds to operation 216, where an enqueue rate of messages at the queuing service is monitored. For example, and without limitation, the enqueue rate of messages at the queuing service 106 is monitored by the health check service 116. The enqueue rate can be monitored to ensure that the enqueue rate is not exceeding the upper or lower thresholds for the predicted message volume.

At operation 218, the enqueue rate is compared with the predicted volume of messages by the health check service. From operation 218, the routine 200 proceeds to operation 220, where based upon the comparison at operation 218 it is determined whether the current level of resources allocated to the message processing service needs to be adjusted. If the resources need to be adjusted, the routine 200 proceeds from operation 220 to operation 222, where the current level of resources allocated to the message processing service is adjusted by the resource management service. The routine 200 then proceeds to operation 224. If the resources do not need to be adjusted, the routine 200 proceeds from operation 210 to operation 224.

At operation 224, processing of messages by the message processing service continues. At operation 226, it is determined if processing of messages is complete. If processing of messages is complete, the routine 200 proceeds to operation 228, where it ends. If processing of messages is not complete, the routine 200 returns to operation 214.

FIG. 3 includes a flow diagram showing a routine 300 that further illustrates aspects of auto-scaling of resources for the environment 100 for AMP messaging infrastructure of FIG. 1, according to one particular configuration. In particular, the routine 300 illustrates aspects of the operation of the environment 100 for providing AMP messaging infrastructure including predictive auto-scaling of resources for the AMP messaging infrastructure.

The routine 300 begins at operation 302, where a history of message receipt, such as, for example, at the queuing service 104, is analyzed. As discussed above, the message receipt history can be analyzed by the message prediction service 112. The routine 300 then proceeds from operation 302 to operation 304, where a future volume of messages to be received is predicted by the message prediction service based upon the analysis of the history of message receipt. For example, and without limitation, the message prediction service 112 can predict a level of messages to be received the next day based upon analyzing the history of message receipt.

From operation 304, the routine 300 proceeds to operation 306, where a peak volume of messages and a low point of message volume to be received is predicted. In particular, the message prediction service 112 predicts a peak volume of messages to be received at a particular time, e.g., an hour of the day, based upon analyzing the history of message receipt, as well as a low point of messages to be received at a particular time. From operation 306, the routine 300 proceeds to operation 308, where an upper bound and a lower bound for processing of the future volume of messages is determined. For example, and without limitation, the upper and lower bounds are determined by the resource management service 114.

At operation 310, it is determined, based upon the predicted message volumes and current level of resources allocated to the message processing service, if the upper and/or lower bounds of message processing will be breached. If the upper and/or lower bounds of message processing will be breached, at operation 312, resources allocated to the message processing service are adjusted such that the upper and lower bounds will not be breached. In particular, the resource management service 114 adjusts the resources to the message processing service 106 based upon the predicted upper and lower bounds for processing of the future volume of messages. From operation 312, the routine 300 proceeds to operation 314, where it ends. If the upper and/or lower bounds of message processing will not be breached, the routine 300 proceeds to operation 314, where it ends.

Figure 4:
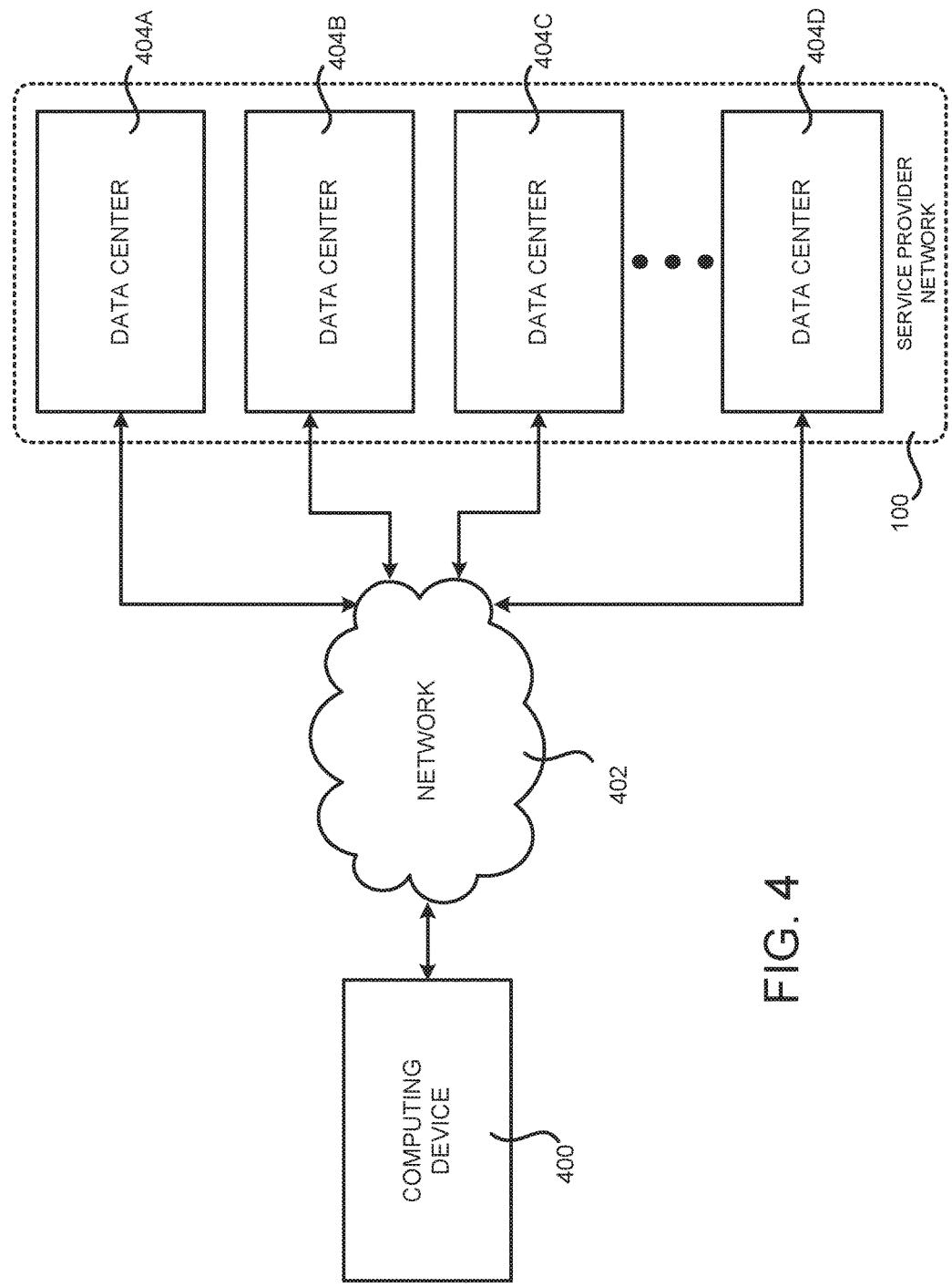
FIG. 4 is a system and network diagram that shows an illustrative operating environment that includes a service provider network that can be configured to implement aspects of the functionality described herein.

FIG. 4 is a system and network diagram that shows one illustrative operating environment for the configurations disclosed herein that includes a service provider network 100. As discussed above, the service provider network 100 can execute network services that provide computing resources on a permanent or an as-needed basis. Among other types of functionality, the computing resources provided by the service provider network 100 can be utilized to implement the various network services described herein. As also discussed above, the computing resources provided by the service provider network 100 can include various types of computing resources, such as data processing resources like VM instances, stateless event-driven compute services, data storage resources, networking resources, data communication resources, network services, and the like.

For example, data processing resources can be available as physical computers or VM instances in a number of different configurations. The VM instances can be configured to execute applications, including Web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

As also discussed above, the computing resources provided by the service provider network 100 are enabled in one implementation by one or more data centers 404A-404D (which might be referred herein singularly as "a data center 404" or in the plural as "the data centers 404"). The data centers 404 are facilities utilized to house and operate computer systems and associated components. The data centers 404 typically include redundant and backup power, communications, cooling, and security systems. The data centers 404 can also be located in geographically disparate locations. One illustrative configuration for a data center 404 that can be utilized to implement the technologies disclosed herein will be described below with regard to FIG. 5.

The customers and other users of the service provider network 100 can access the computing resources provided by the service provider network 100 over a network 402, which can be a wide area communication network ("WAN"), such as the Internet, an intranet or an Internet service provider ("ISP") network or a combination of such networks. For example, and without limitation, a computing device 400 operated by a customer or other user of the service provider network 100 can be utilized to access the service provider network 100 by way of the network 402. It should be appreciated that a local-area network ("LAN"), the Internet, or any other networking topology known in the art that connects the data centers 404 to remote customers and other users can be utilized. It should also be appreciated that combinations of such networks can also be utilized.

Figure 5:
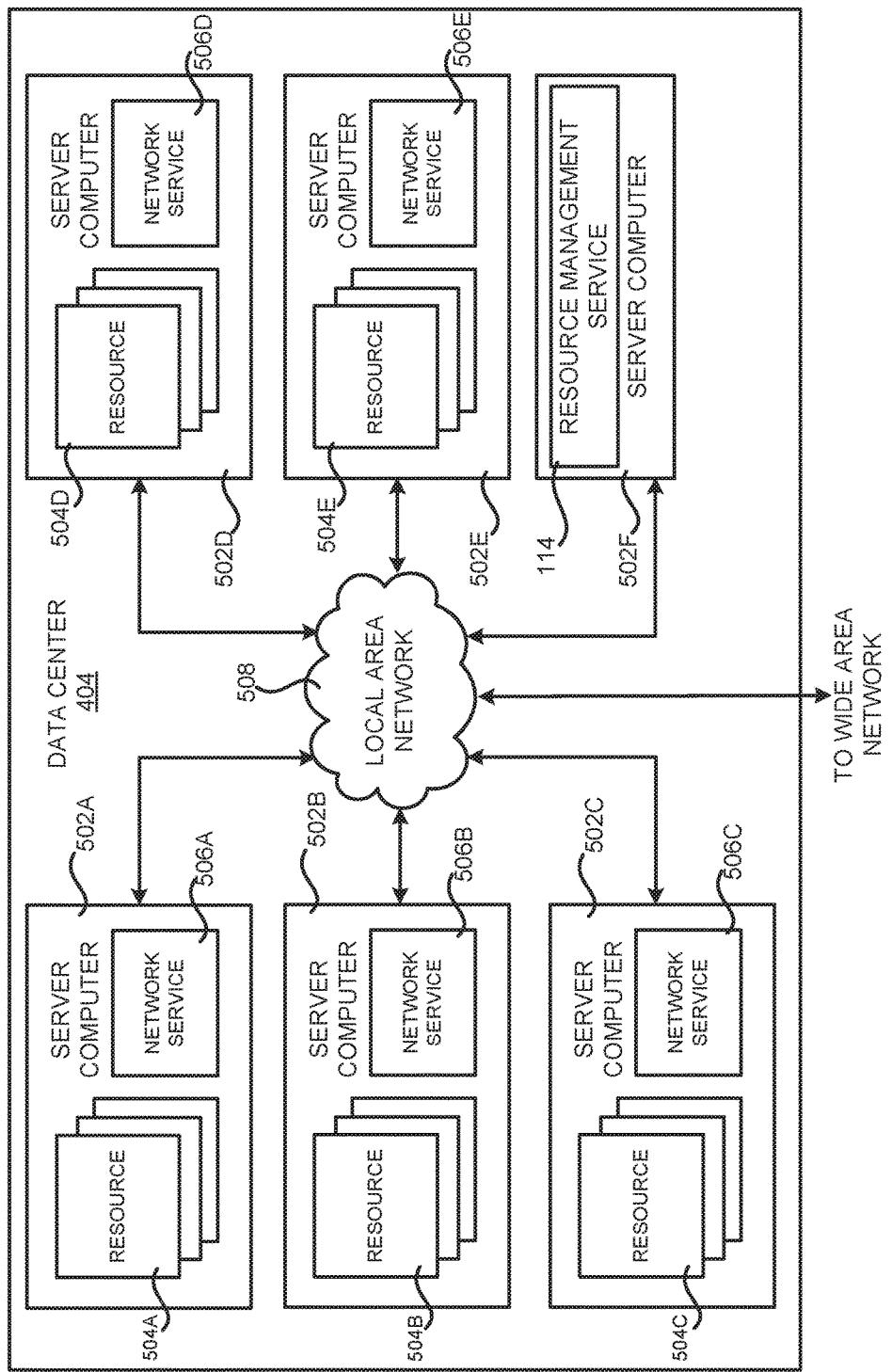
FIG. 5 is a computing system diagram illustrating a configuration for a data center that can be utilized to implement aspects of the technologies disclosed herein.

FIG. 5 is a computing system diagram that illustrates one configuration for a data center 404 that implements aspects of the technologies disclosed herein. The example data center 404 shown in FIG. 5 includes several server computers 502A-502F (which might be referred to herein singularly as "a server computer 502" or in the plural as "the server computers 502") for providing the computing resources 504A-504E.

The server computers 502 can be standard tower, rackmount, or blade server computers configured appropriately for providing the computing resources 504 described herein (illustrated in FIG. 5 as the computing resources 504A-504E). As mentioned above, the computing resources 504 provided by the service provider network 100 can be data processing resources such as VM instances or hardware computing systems, data storage resources, database resources, networking resources, and others. Some of the servers 502 can also be configured to execute network services 506A-506E, respectively, capable of instantiating, providing and/or managing the computing resources 504, some of which are described in detail below with regard to FIG. 6.

The data center 404 shown in FIG. 5 also includes a server computer 502F that can execute some or all of the software components described above. For example, and without limitation, the server computer 502F can be configured to execute the resource management service 114, which was described in detail above. The server computer 502F can also be configured to execute other components and/or to store data for providing some or all of the functionality described herein. In this regard, it should be appreciated that the resource management service 114 can execute on many other physical or virtual servers in the data centers 404 in various configurations.

In the example data center 404 shown in FIG. 5, an appropriate LAN 508 is also utilized to interconnect the server computers 502A-502F. The LAN 508 is also connected to the network 402 illustrated in FIG. 4. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 404A-404D, between each of the server computers 502A-502F in each data center 404, and, potentially, between computing resources 504 in each of the data centers 404. It should be appreciated that the configuration of the data center 404 described with reference to FIG. 5 is merely illustrative and that other implementations can be utilized.

Figure 6:
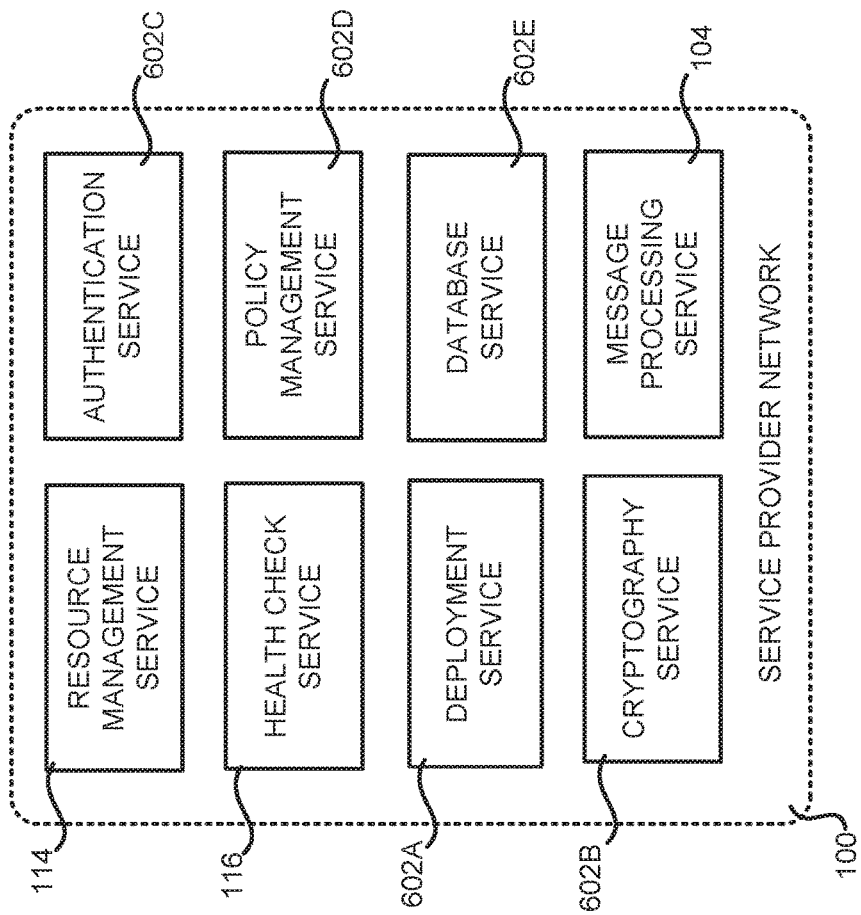
FIG. 6 is a network services diagram that shows aspects of several services that can be provided by and utilized within a service provider network configured to implement the various technologies disclosed herein.

FIG. 6 is a system and network diagram that shows aspects of several network services that can be provided by and utilized within the service provider network 100 in one configuration disclosed herein. In particular, and as discussed above, the service provider network 100 can provide a variety of network services to customers and other users of the service provider network 100 including, but not limited to, the resource management service 114, the health check service 116, and the message processing service 106. The service provider network 100 can also provide other types of services including, but not limited to, a deployment service 602A, a cryptography service 602B, an authentication service 602C, and/or a policy management service 602D, each of which is described in greater detail below. Additionally, the service provider network 100 can also provide other types of network services, some of which are also described in greater detail below.

It should be appreciated that customers of the service provider network 100 can include organizations or individuals that utilize some or all of the services provided by the service provider network 100. As described above, a customer or other user can communicate with the service provider network 100 through a network, such as the network 402 shown in FIG. 4. Communications from a customer computing device to the service provider network 100 can cause the services provided by the service provider network 100 to operate in accordance with the described configurations or variations thereof.

It is noted that not all configurations described include the services described with reference to FIG. 4 and that additional network services can be provided in addition to or as an alternative to the services explicitly described herein. Each of the services shown in FIG. 4 can also expose network service interfaces that enable a caller to submit appropriately configured application programming interface ("API") calls to the various services through network service requests. In addition, each of the services can include service interfaces that enable the services to access each other.

The service provider network 100 can also include a cryptography service 602B. The cryptography service 602B can utilize storage services of the service provider network 100 to store encryption keys in encrypted form, whereby the keys can be usable to decrypt customer keys accessible only to particular devices of the cryptography service 602B. The cryptography service 602B can also provide other types of functionality not specifically mentioned herein.

As illustrated in FIG. 6, the service provider network 100, in various configurations, also includes an authentication service 602C and a policy management service 602D. The authentication service 602C, in one example, is a computer system (i.e., collection of computing resources 504) configured to perform operations involved in authentication of users. For instance, one of the services shown in FIG. 6 can provide information from a user to the authentication service 602C to receive information in return that indicates whether or not the requests submitted by the user are authentic.

The policy management service 602D, in one example, is a network service configured to manage policies on behalf of customers or internal users of the service provider network 100. The policy management service 602D can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 100 can additionally maintain other services based, at least in part, on the needs of its customers. For instance, the service provider network 100 can maintain a deployment service 602A for deploying program code and/or a database service 602E in some configurations. The database service 602E can be a collection of computing resources that collectively operate to create, maintain, and allow queries to be performed on databases stored within the service provider network 100. For example, a customer or other user of the service provider network 100 can operate and manage a database from the database service 602E by utilizing appropriately configured network API calls. This, in turn, can allow the customer to maintain and potentially scale the operations in the database. Other services include object-level archival data storage services, and services that manage, monitor, interact with, or support other services. The service provider network 100 can also be configured with other network services not specifically mentioned herein in other configurations.

Figure 7:
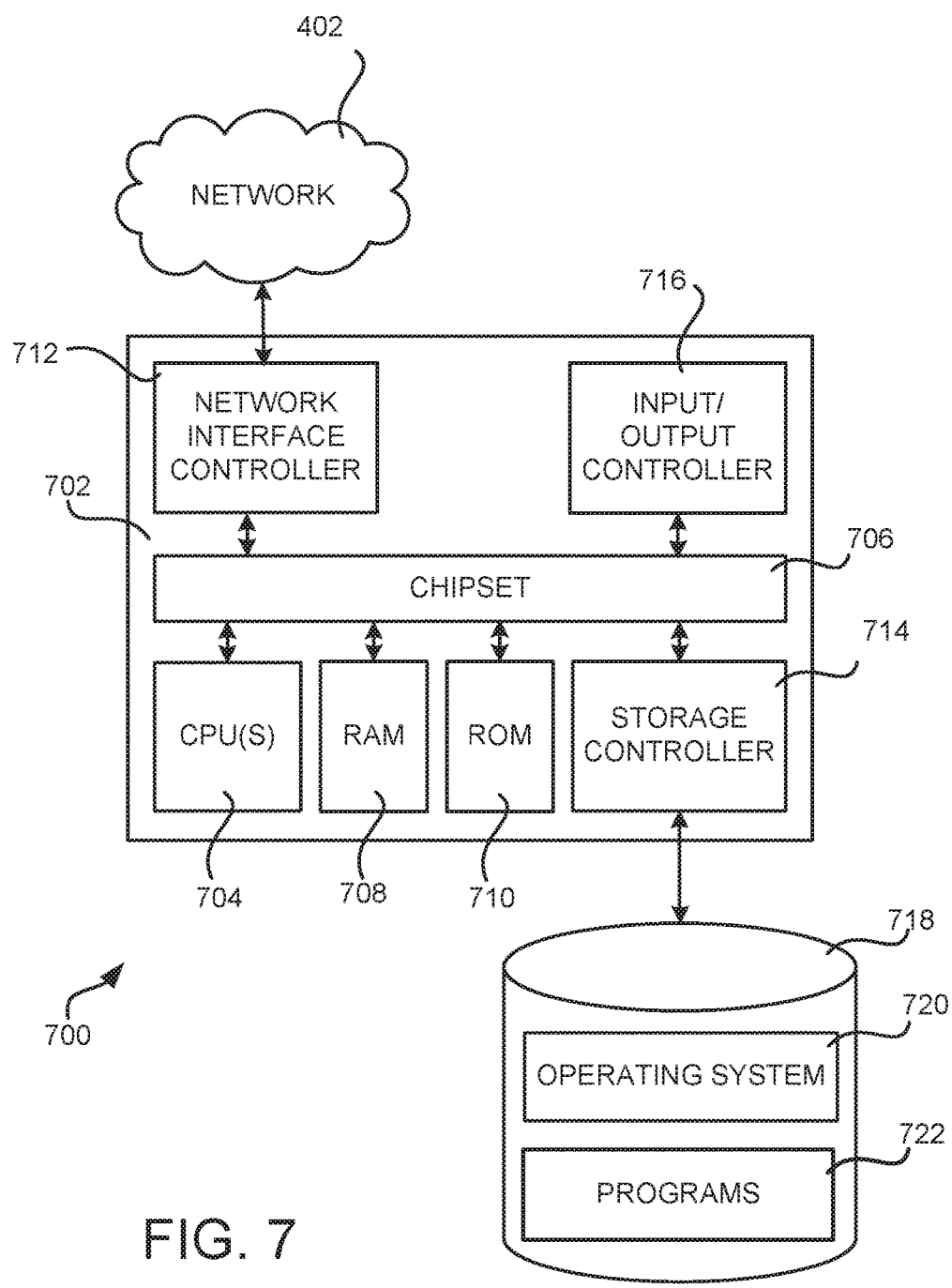
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a NIC 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 718 can store other system or application programs and data utilized by the computer 700.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1-3. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or another type of output device. It will be appreciated that the computer 700 might not include all of the components shown in FIG. 7, can include other components that are not explicitly shown in FIG. 7, or might utilize an architecture completely different than that shown in FIG. 7.

Based on the foregoing, it should be appreciated that technologies for AMP messaging infrastructure with predictive auto-scaling of resources and reactive auto-scaling of resources have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A service provider network comprising:
   a network-accessible message processing service comprising asynchronous messaging protocol (AMP) infrastructure and configured to process messages;
   a message prediction service configured to analyze control metrics for the network-accessible message processing service;
   a resource management service configured to (i) predict, based upon the analyzing, a predicted level of resources needed by the network-accessible message processing service for processing of messages, and (ii) allocate, based at least in part upon the predicted level of resources, a first level of resources for the network-accessible message processing service for processing of messages;
   a network-accessible queuing service configured to receive a stream of messages for processing by the network-accessible message processing service; and
   a health check service configured to monitor an enqueue rate of messages at the network-accessible queuing service,
   wherein based upon the monitoring, the resource management service is further configured to adjust the first level of resources for the network-accessible message processing service to a second level of resources.

2. The service provider network of claim 1, wherein the message prediction service is configured to analyze the control metrics for the network-accessible message processing service by comparing at least one of (i) a predicted volume of messages for a period of time with a current level of resources for the network-accessible message processing service, (ii) a predicted peak volume of messages during the period of time with the current level of resources, or (iii) a predicted low point of message volume.

3. The service provider network of claim 2, wherein the resource management service is configured to allocate the first level of resources for the network-accessible message processing service for processing of messages based upon when at least one of (i) the predicted volume of messages for the period of time exceeds an upper threshold of utilization of the current level of resources for the network-accessible message processing service or (ii) the predicted peak volume of messages during the period of time exceeds the upper threshold of utilization of the current level of resources, increasing the current level of resources to the first level of resources.

4. The service provider network of claim 2, wherein the resource management service is configured to allocate the first level of resources for the network-accessible message processing service for processing of messages based upon when at least one of (i) the predicted volume of messages for the period of time is lower than a lower threshold of utilization of the current level of resources for the network-accessible message processing service or (ii) the predicted peak volume of messages during the period of time is lower than the lower level of utilization of the current level of resources, decreasing the current level of resources to the first level of resources.

5. The service provider network of claim 1, wherein the resources for the network-accessible message processing service comprises a fleet of servers.

6. The service provider network of claim 1, wherein the resources for the network accessible message processing service comprise stateless event-driven compute services.

7. An apparatus, comprising:
   one or more processors; and
   at least one non-transitory computer-readable storage medium having computer-executable instructions stored thereupon which, when executed by the one or more processors, cause the system to:
   predict a predicted level of resources for a network-accessible message processing service for processing of messages, wherein the network-accessible message processing service comprises asynchronous messaging protocol (AMP) infrastructure,
   based, at least in part upon the predicted level of resources, allocate a first level of resources for the network-accessible message processing service for processing of messages from a queuing service,
   monitor an enqueue rate of messages at the network-accessible queuing service, and
   based, at least in part upon the monitoring, adjust the first level of resources for the network-accessible message processing service to a second level of resources.

8. The apparatus of claim 7, wherein the computer-executable instructions further cause the apparatus to predict the predicted level of resources by comparing at least one of (i) a predicted volume of messages for a period of time with a current level of resources for the network-accessible message processing service, (ii) a predicted peak volume of messages during the period of time with the current level of resources, or (iii) a predicted low point of message volume.

9. The apparatus of claim 8, wherein the computer-executable instructions further cause the apparatus to allocate the first level of resources for the network-accessible message processing service for processing of messages by increasing the current level of resources to the first level of resources when at least one of (i) the predicted volume of messages for the period of time exceeds an upper threshold of utilization of the current level of resources for the network-accessible message processing service or (ii) the predicted peak volume of messages during the period of time exceeds the upper threshold of utilization of the current level of resources.

10. The apparatus of claim 8, wherein the computer-executable instructions further cause the apparatus to allocate the first level of resources for the network-accessible message processing service for processing of messages by decreasing the current level of resources to the first level of resources when at least one of (i) the predicted volume of messages for the period of time is lower than a lower threshold of utilization of the current level of resources for the network-accessible message processing service or (ii) the predicted peak volume of messages during the period of time is lower than the lower level of utilization of the current level of resources.

11. The apparatus of claim 7, wherein the resources for the network-accessible message processing service comprises a fleet of servers.

12. The apparatus of claim 7, wherein the resources for the network accessible message processing service comprise stateless event-driven compute services.

13. The apparatus of claim 7, wherein the computer-executable instructions further cause the apparatus to adjust the first level of resources for the network-accessible message processing service to the second level of resources for the network-accessible message processing services when at least one of (i) the predicted volume of messages for the period of time exceeds an upper threshold of utilization of the current level of resources for the network-accessible message processing service, (ii) the predicted peak volume of messages during the period of time exceeds the upper threshold of utilization of the current level of resources, (iii) the predicted volume of messages for the period of time is lower than a lower threshold of utilization of the current level of resources for the network-accessible message processing service, or (iv) the predicted peak volume of messages during the period of time is lower than the lower level of utilization of the current level of resources.

14. The apparatus of claim 13, wherein the computer-executable instructions further cause the apparatus to delay adjusting the first level of resources for the network-accessible message processing service to the second level of resources for the network-accessible message processing services for a predetermined amount of time when (iii) the predicted volume of messages for the period of time is lower than a lower threshold of utilization of the current level of resources for the network-accessible message processing service, or (iv) the predicted peak volume of messages during the period of time is lower than the lower level of utilization of the current level of resources.

15. A non-transitory computer-readable storage medium having computer-executable instructions stored thereupon which, when executed by the one or more processors, cause the one or more processors to:
predict a predicted level of resources for a network-accessible message processing service for processing of messages, wherein the network-accessible message processing service comprises asynchronous messaging protocol (AMP) infrastructure;
based, at least in part upon the predicted level of resources, allocate a first level of resources for the network-accessible message processing service for processing of messages from a queuing service;
monitor an enqueue rate of messages at the network-accessible queuing service; and
based, at least in part upon the monitoring, adjust the first level of resources for the network-accessible message processing service to a second level of resources.

16. The non-transitory computer-readable storage medium of claim 15, wherein the computer-executable instructions further cause the one or more processors to predict the predicted level of resources by comparing at least one of (i) a predicted volume of messages for a period of time with a current level of resources for the network-accessible message processing service, (ii) a predicted peak volume of messages during the period of time with the current level of resources, or (iii) a predicted low point of message volume.

17. The non-transitory computer-readable storage medium of claim 16, wherein the computer-executable instructions further cause the one or more processors to allocate the first level of resources for the network-accessible message processing service for processing of messages by increasing the current level of resources to the first level of resources when at least one of (i) the predicted volume of messages for the period of time exceeds an upper threshold of utilization of the current level of resources for the network-accessible message processing service or (ii) the predicted peak volume of messages during the period of time exceeds the upper threshold of utilization of the current level of resources.

18. The non-transitory computer-readable storage medium of claim 16, wherein the computer-executable instructions further cause the one or more processors to allocate the first level of resources for the network-accessible message processing service for processing of messages by decreasing the current level of resources to the first level of resources when at least one of (i) the predicted volume of messages for the period of time is lower than a lower threshold of utilization of the current level of resources for the network-accessible message processing service or (ii) the predicted peak volume of messages during the period of time is lower than the lower level of utilization of the current level of resources.

19. The non-transitory computer-readable storage medium of claim 15, wherein the computer-executable instructions further cause the one or more processors to adjust the first level of resources for the network-accessible message processing service to the second level of resources for the network-accessible message processing services when at least one of (i) the predicted volume of messages for the period of time exceeds an upper threshold of utilization of the current level of resources for the network-accessible message processing service, (ii) the predicted peak volume of messages during the period of time exceeds the upper threshold of utilization of the current level of resources, (iii) the predicted volume of messages for the period of time is lower than a lower threshold of utilization of the current level of resources for the network-accessible message processing service, or (iv) the predicted peak volume of messages during the period of time is lower than the lower level of utilization of the current level of resources.

20. The non-transitory computer-readable storage medium of claim 19, wherein the computer-executable instructions further cause the one or more processors to delay adjusting the first level of resources for the network-accessible message processing service to the second level of resources for the network-accessible message processing services for a predetermined amount of time when (i) the predicted volume of messages for the period of time is lower than a lower threshold of utilization of the current level of resources for the network-accessible message processing service or (ii) the predicted peak volume of messages during the period of time is lower than the lower level of utilization of the current level of resources.

* * * * *